United States Patent [19]

Kronseder

[11] Patent Number: 5,038,917

[45] Date of Patent: Aug. 13, 1991

[54] APPARATUS FOR CONVEYING BOTTLES TO A BOTTLE PROCESSING MACHINE

[76] Inventor: Hermann Kronseder, Regensburger Strasse 4, 8404 Wörth, Fed. Rep. of Germany

[21] Appl. No.: 561,943

[22] Filed: Aug. 2, 1990

[30] Foreign Application Priority Data

Aug. 12, 1989 [DE] Fed. Rep. of Germany ....... 3926735

[51] Int. Cl.⁵ ............................................ B65G 43/00

[52] U.S. Cl. .................................... 198/444; 198/408; 198/445

[58] Field of Search ............... 198/408, 409, 444, 445, 198/446, 468.7

[56] References Cited

U.S. PATENT DOCUMENTS

| | | | |
|---|---|---|---|
| 3,444,980 | 5/1969 | Wiseman | 198/445 |
| 3,465,868 | 9/1969 | Donner | 198/444 |
| 3,643,780 | 2/1972 | Shimogaki et al. | 198/408 |
| 3,710,918 | 1/1973 | Babunovic | 198/445 |
| 4,060,166 | 11/1977 | Hartness et al. | 198/446 |
| 4,173,276 | 11/1979 | Raudat et al. | 198/446 X |
| 4,199,049 | 4/1980 | Vamvakas | 198/408 |
| 4,273,237 | 6/1981 | Wahl et al. | 198/445 |
| 4,375,374 | 3/1983 | Kronseder et al. | 198/445 X |
| 4,889,225 | 12/1989 | van Uitert | 198/445 X |
| 4,895,245 | 1/1990 | Bauers et al. | 198/445 X |

FOREIGN PATENT DOCUMENTS

| | | | |
|---|---|---|---|
| 1009517 | 11/1957 | Fed. Rep. of Germany . | |
| 1244644 | 7/1967 | Fed. Rep. of Germany | 198/445 |
| 1432358 | 1/1970 | Fed. Rep. of Germany . | |
| 1902018 | 8/1970 | Fed. Rep. of Germany | 198/408 |
| 2535064 | 2/1977 | Fed. Rep. of Germany | 198/408 |
| 2614711 | 3/1986 | Fed. Rep. of Germany . | |
| 2004516 | 11/1969 | France | 198/408 |
| 521219 | 7/1976 | U.S.S.R. | 198/408 |
| 2199296 | 7/1988 | United Kingdom | 198/445 |

OTHER PUBLICATIONS

Seitz information, 1977.

*Primary Examiner*—Robert P. Olszewski
*Assistant Examiner*—Cheryl L. Gastineau
*Attorney, Agent, or Firm*—Fuller, Ryan & Hohenfeldt

[57] ABSTRACT

A device for supplying bottles to a bottle washing machine which has an inlet and a transfer table in front of the inlet. The transfer table is partitioned into four major compartments which are each subdivided into individual passageways under which there are adjacent conveyor belts or bottles constituting the transfer table. The transfer table surface is inclined by about 4° in the direction in which the bottles flow toward the inlet of the washing machine and this feature, among others, results in reducing the forces generated between bottles that have accumulated in the area from which they are transferred to the washing machine.

16 Claims, 2 Drawing Sheets

APPARATUS FOR CONVEYING BOTTLES TO A BOTTLE PROCESSING MACHINE

BACKGROUND OF THE INVENTION

The invention disclosed herein relates to a method for supplying bottles or the like to a processing machine such as a bottle washing machine which has an inlet in front of which there are a series of successively arranged transfer stations for transferring bottles in succession to the inlet, where at least one stream of bottles is supplied by means of a supply conveyor to transfer conveyor surfaces in the transfer stations and the bottles are then advanced in single file between divider members or partitions to the individual input channels of the washing machine which provide for uniform distribution of bottles going into the machine. The invention includes apparatus for carrying out the method.

The bottle moving and guiding apparatus at the inlet to a bottle washing machine is critical to good functioning of the machine. It is here that much unwanted noise and other problems occur as a result of the complexity of admitting bottles to the washing machine with even distribution. In the system for supplying bottles to the washing machine, the bottles are usually transported in parallelism on individual tracks along lines which are perpendicular to the direction in which they enter the washing machine so they must be deflected and directed to a transfer table which is operative to present the bottles to the machine inlet. The supply conveyors which supply bottles to the transfer table, which are preferably comprised of parallel conveyor belts, causes the bottles to be advanced into individual passageways established by dividers where they are acted on by means of rotating arms and are lifted and supplied to the cells of rotating bottle baskets in the bottle washing machine. To ensure that a stream of bottles corresponds to the width of the passageways or spaces between the divider members on the transfer table and also to ensure that all passageways are sufficiently loaded with bottles for being lifted by the rotating arms, some amount of pressure develops between the bottles which accumulate in front of the dividers. This high pressure due to accumulation of bottles often leads to bottle breakage and to jamming, particularly in front of the passageways or dividers which therefore must be monitored and corrected by servicing personnel.

Various solutions to the foregoing problems have been proposed.

In German Patent DE-PS 10 09 517 apparatus is described in which a transfer plate is provided between the transfer table and the bottle supply conveyor. The transfer plate oscillates in its own horizontal plane to loosen up or expand the stream of bottles. In modern cleaning machines having 40 to 50 inlet passageways, oscillating the bottles alleviates excessive pressure or interacting forces between bottles only to a limited degree. When a bottle jam up occurs, the frictional force between bottles and the transfer plate is no longer sufficient to move the bottles.

In published German application DE-OS 14 32 358 an inlet for a bottle Washing machine is known in which a plurality of controlled movable deflection flaps are arranged on the side of the advancing supply conveyor facing away from the washing machine, with the aid of which a massive low impediment transfer of bottles ought to be possible. This device functions intermittently so that there is no guarantee there will be a sufficient number of bottles heading into the washing machine. In addition, the deflectors and their drive units must be very stable mechanically in order to resist the forces that result. When the conveyor belts are too full, there can be a blockage of the deflectors.

In German Patent DE-PS 26 14 711 a bottle washing machine is described in connection with which there is a supply conveyor which advances bottles in an oblique manner with regard to the longitudinal axis of the cleaning machine. The interacting forces between bottles with this device is thereby somewhat reduced. A relatively wide saw tooth type transfer plate which is required for the oblique feed of the bottles and which creates a number of obstructive edges impedes the transfer of bottles disadvantageously. Furthermore, a relatively wide conveyor is required by means of which the accessibility to the transfer table is greatly hindered. This has a very disadvantageous effect if a bottle jam in front of the passageways or dividers needs to be freed up or if obstructions formed by fallen bottles are to be avoided.

An installation of the first mentioned type of apparatus supplying bottles is described in the document "Seitz Information", 1977. The interacting force of the bottles is reduced with this device in that the surface of the transfer table is divided into numerous accumulation zones which are individually loaded with bottles by means of conveyors. The intended reduction in the accumulation pressure or interacting forces between bottles resulting from these measures is, however, not sufficient in many cases, especially when the bottle transfer rate is very high and the bottles have large diameters.

SUMMARY OF THE INVENTION

An objective of the invention is to provide a method and apparatus for supplying bottles to a bottle processing machine, such as a bottle washing machine, so that the bottles are transferred without problems such as jam ups and breakage which result from development of high interacting forces between the bottles accumulated in front of the dividers which form the passageways through which the columns of bottles are directed into the inlet of the washing machine. This objective is achieved, in part, by means of the method which features a transfer conveyor surface adjacent the inlet of the machine that inclines upwardly in the direction in which the bottles are moving towards the inlet.

With the new method, the accumulation or distribution of bottles depending on the width of the spacing of the dividers on the transfer conveyor surface is surprisingly assisted by the force directed away from the inlet path to the washing machine, resulting in a decrease in bottle propelling force and in the forces due to accumulation of bottles directly in front of the passageways due to the incline in the accumulating surface. As a result, bottle breakage, abnormal lifting of bottles that follow the bottle just accepted by the machine, jam ups in or in front of the passageways at the transfer conveyor and other interferences in these particularly problematical areas are substantially avoided. However, if jam ups do occur, they are readily eliminated as a result of the low bottle compacting forces or pressure between bottles on the transfer conveyor. The conveyor belts which form the accumulation area or transfer table can therefore operate continually without need for a decrease in speed or even a temporary period of non-operation.

A feature of the invention is that the supply of bottles to the transfer conveyor surface by means of the supply conveyors takes place such that bottle-free buffer zones are maintained on the conveying surface on both sides of the stream of bottles that accumulates in front of the individual bottle passageways which lead to the inlet of the bottle washing machines. These buffer zones keep the bottles in the conveying surface area free of pressure, even with fluctuations in the supply of bottles, and simplify the control of the bottle supply conveyers.

It is particularly advantageous, according to the invention, when the angles of inclination for the transfer conveyor surfaces are 3° to 5° with respect to horizontal. In one embodiment of the invention, provides for the supply conveyor surface being at the same angle with respect to horizontal as the transfer conveyor surface. The angular range of 3° to 5° provides sufficient load relief for the bottles just in front of the passageways to the inlet of the bottle washing machine.

Another important feature of the invention is that the lengths of the dividers, which create the passageways in which the bottles are guided to the transfer conveyor, project upstream toward the incoming accumulated bottle stream and have a central divider which is longest of the dividers and there are increasingly shorter dividers symmetrically arranged on each side of the central divider. This arrangement is of considerable assistance in the expansion of the bottle stream to correspond to the total width of the plurality of passageways defined by the dividers.

How the foregoing objectives and other more specific objectives of the invention are achieved will be evident in the ensuing more detailed description of a preferred embodiment of the invention which will now be set forth in reference to the drawings.

DESCRIPTION OF A PREFERRED EMBODIMENT

Figure 1:
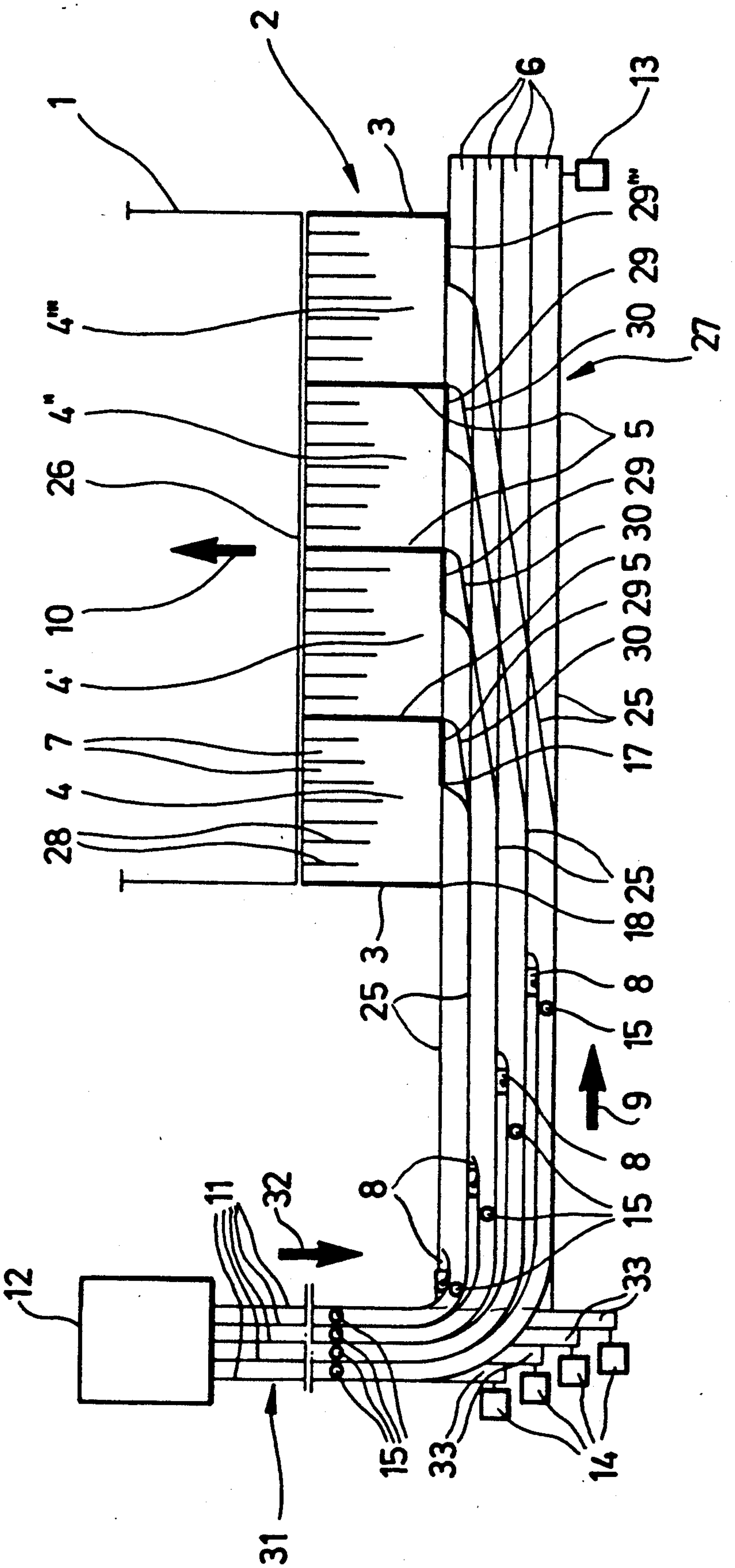
FIG. 1 is a diagrammatic plan view of an illustrative apparatus for supplying bottles to the inlet of a bottle processing machine.

In FIG. 1 the sides of the inlet for bottles 15 to a washing machine are identified by the reference numeral 1. Transfer of the bottles into the machine takes place over a line marked 26. The bottles are transferred into the washing machine in the direction indicated by the arrow 10. A transfer table 2, comprised of a plurality of transfer conveyors as will be explained, is arranged in front of the inlet 1 of the washing machine. Four bottle accumulating surfaces or areas 4, 4', 4'' and 4''' are formed between laterally spaced apart boundary walls 3, 3. The four separate bottle accumulating areas or surfaces result from dividing the transfer table 2 by means of three barriers or walls 5. As illustrated in more detail in FIG. 3, the bottle accumulating surfaces or areas 4 are implemented by means of movable transfer table conveying surfaces 4 through which the bottles are moved toward the inlet 1 of the washing machine. The outfeed end of the transfer table 2 is adjacent the inlet 1 of the machine and the infeed end of transfer table 2 is adjacent a bottle supply conveyor 27 and the infeed end area constitutes the bottle accumulating areas 4–4''' of the transfer table. The lateral boundaries 3 and the separating barriers 5 which divide the accumulating surfaces can be implemented with rails formed of rods, bars or continuous strips which are not shown in detail. The areas 4–4''' are further subdivided or partitioned by guide means in the form of divider members 28 which form passageways 7 through which the bottles are transported in single file in each one of the passageways toward devices 16, 20 (see FIGS. 2 and 3) which pick up the bottles and transfer them into the inlet 1 of the bottle washing machine. The divider members 28 can be implemented in various ways such as by rails or continuous metal plates, not shown. As shown in the preferred embodiment, the divider members 28 in the respective bottle accumulating surfaces 4–4''' have different lengths, the center divider being the longest and the other divider members, which are arranged symmetrically to the center divider member, decrease in length as they proceed away from the center member. In an actual embodiment, the divider members 28 are supported from a mounting device, not shown.

Figure 3:
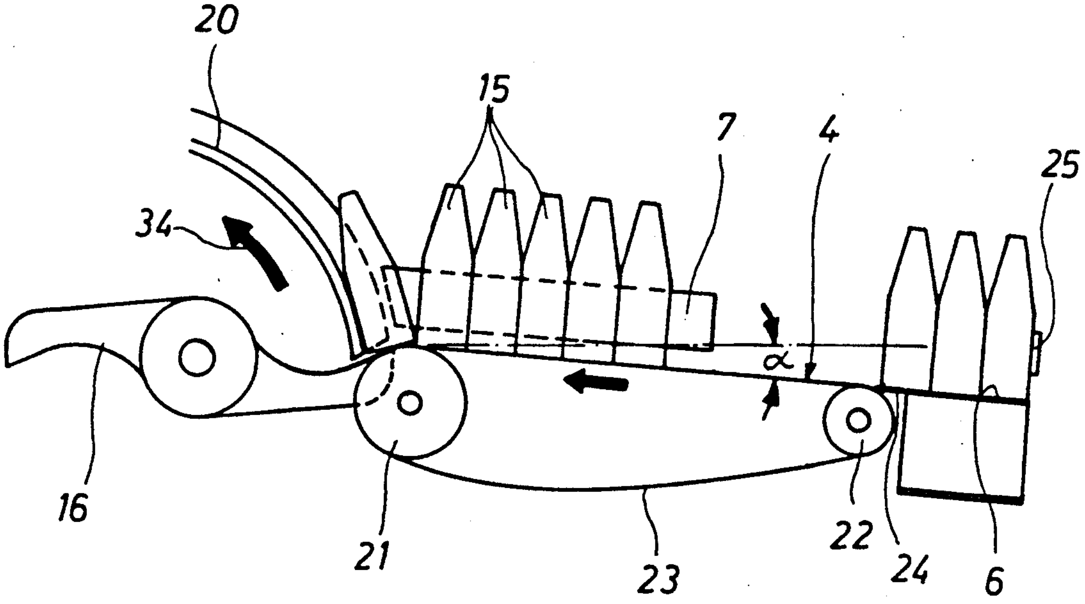
FIG. 3 is a side elevational view of that part of the bottle accumulating transfer conveyor which is depicted in the preceding figure.

As shown in FIG. 3, the bottle accumulation surfaces of the transfer table 2 are inclined in the direction of bottle flow by an angle, alpha, with respect to the horizontal. This angle has a preferable range of 3° to 5°. In one actual embodiment, the angle, alpha, is 4°.

A bottle supply conveyor system 27 provides a separate supply conveyor belt 6 leading to each of the respective accumulation areas 4–4''' of transfer table 2. The four conveyor belts 6 of the conveyor system 27 are driven by a motor 13. The upper surfaces of conveyor belts 6 form a coplanar surface which connects laterally and at the same level to the four bottle accumulation surfaces 4, 4', 4'' and 4''' of transfer table 2. The upper facing surfaces of conveyor belts 6 form a common laterally extending surface which is inclined toward the inlet by about 4° transverse to the direction of movement of the conveyor belt as can be perceived in FIG. 3. The incline prevents interference points at the transition zone to the accumulation surfaces 4–4''' for the bottles and the deflection to the accumulation surfaces is thereby simplified.

There are laterally separated guides 25 for the individual conveyors 6. The guides 25 are spaced apart sufficiently to provide for a stream of bottles having two bottles in a row. Vertical mounting supports, not shown, for the lateral guides 25 can be provided between the individual conveyor belts 6 or the supports can be arranged over the belts. As a result of the incline of the conveyor belt 6, the bottles lie against one of the lateral guides 25 with reduced pressing force, providing beneficial results with respect to the reduction of noise and inducement of the bottles into a prearrangement. The ends of the guides 25 are curved in the direction toward the transfer table 2 while obliquely crossing the conveyor belts 6 so that deflection of the bottles occurs during further movement of the conveyor belt that is arranged closest to the transfer table up to the supply inlets of the accumulation surfaces 4. There are side branches 30 for the lateral guides 25 which back up the extensions 29 of the lateral guides so that the guides do not spread open by an amount that would accommodate more than two bottles in a row. The ends of the lateral guides 25 make a transition into the front boundaries 29 of the accumulation surfaces 4 through the formation of rounded edges, or proceed directly up to the ends of the front boundaries. The lateral guides 25 and the side branches 30 stop at the end of the lateral boundary 3 at the ends of the barrier walls 5. There are sensors 8 that indicate accumulation of bottles. The arrow marked 9 defines the direction in which the bottles are supplied by supply conveyor system 27 which is at a right angle to the direction of flow into the washing machine indicated by the arrow 10.

Another conveyor section is identified by the numeral 31. This conveyor section 31 comprises four conveyor belts 33 arranged next to each other and individually driven by drive motors 14 in the direction of the arrow 32. There are laterally spaced apart guides 11 extending along belts 33. The distance between lateral guides 33 is only sufficient to allow bottles to be transported in single file. Lateral guides 11 are curved at their ends for redirecting the bottles into the direction in which the supply conveyor system 27 transports them. Lateral guides 11 terminate between two of the lateral guides 25 of conveyor 27 so that the bottles convert from single file to two bottles in a row. Bottles which are to be washed are to be fed into a loading device 12 from bottle cases. The loading device deposits the bottles on parallel belts 33 of conveyor 31.

Figure 2:
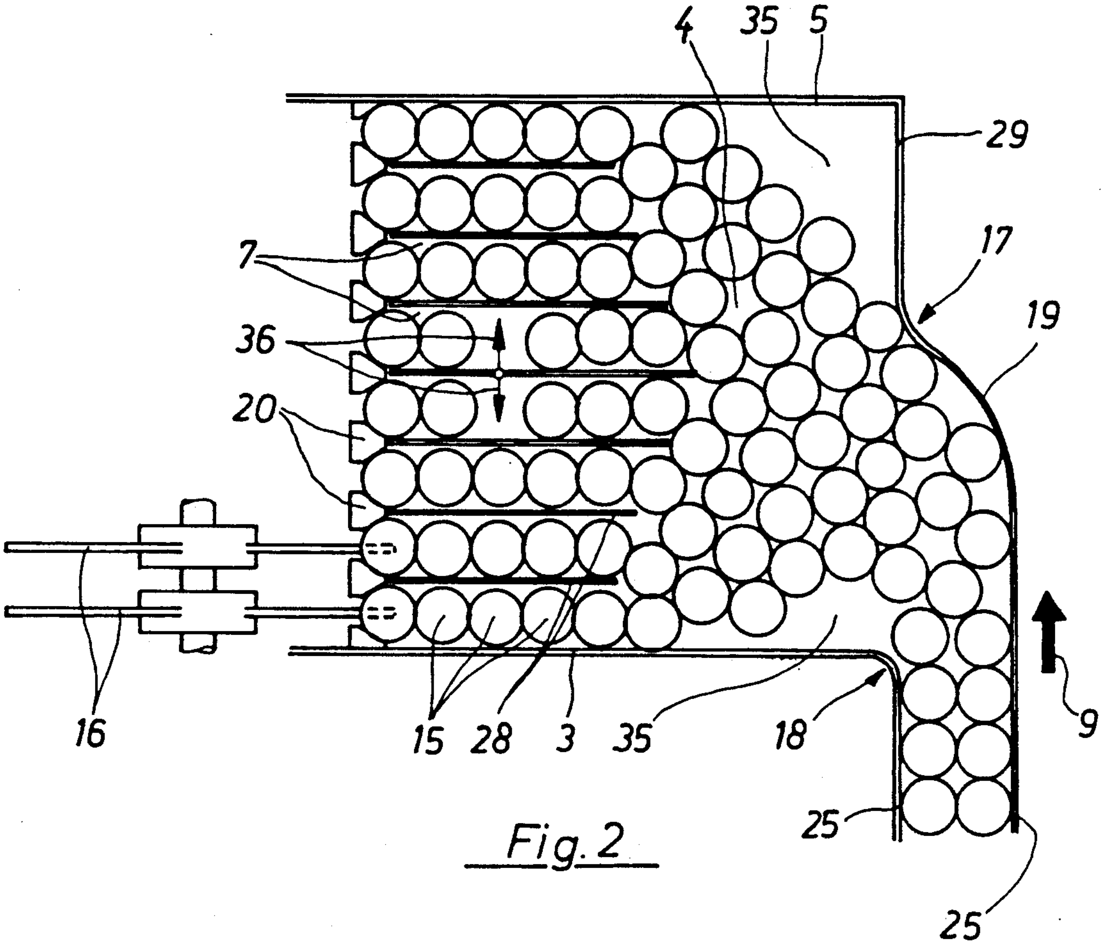
FIG. 2 is an expanded view of part of the apparatus shown in FIG. 1 and shows one of four bottle accumulating surfaces in plan view.

A single typical one of the accumulation surfaces 4 of transfer table 2 is shown in FIG. 1. Rotating members 16 lift bottles 15 which have reached the end of a partition or passageway 7 along a slide rail 20. The double headed arrow 36 in FIG. 2 indicates that the dividers 28 can move transversely of the stream of advancing bottles within predetermined limits in order to make entry of the bottles into the passageways 7 more straightforward. The width of the passageways 7 shown in FIGS. 1 and 2 is a little greater than the diameter of the bottles. The guides 25 of the supply conveyor 27 are formed with rounded corners which are junction points between the side boundaries 3 of the transfer table accumulation surfaces 4 and the lateral guide 25 of the conveyor between the front boundary 29 and the lateral guide 25 that proceeds as a curved shape 19 obliquely over the conveyor belt 6 which is not shown in FIG. 2.

FIG. 3 shows one of the conveyor belts 23 which makes up the transfer table 2. Conveyor belt 23 runs over rollers 21 and 22 and is driven either intermittently or continuously in the direction of the arrow which is applied to the conveyor belt. There is one more conveyor belt 23 than there are partitions or passageways 7 in which case the bottles in the passageways rest on the edges or margins of two adjacent conveyor belts 23 and bottle lifting devices 16 extend beyond the conveyor belts and lift the front bottle into the washing machine. The bottle accumulation surface 4 of the transfer table 2 that is comprised of the conveyor belts 23 is contiguous with a transfer plate 24 at the end of bottle supply conveyor 27 for the purpose of preventing bottles from tipping while they are being transferred to transfer table 2. If conveyor belts 23 were shortened, transfer plate 24 would have to be made wider. The angle, alpha, indicated in FIG. 3 that designates the angle of inclination of the accumulation surfaces is preferably 4°.

The bottles 15 that are loaded into loading device 12 proceed by means of individual conveyors 31 and 27 to the accumulation surfaces 4–4'''. When the transfer devices 16, 20 of the bottle washing machine 1 have a given transfer speed, the bottles accumulate on the accumulation surfaces 4–4''' of the transfer table 2 which results in distributing the stream of bottles uniformly among the four accumulation surfaces which are present in this embodiment. The bottle backup sensors 8 can control the speed of conveyors 33 by varying the speed of motors 14 so that regulation of the bottle supply occurs and there is only a small additional pressure generated between bottles in the advancing bottle stream as they stand on the accumulation surfaces 4–4'', By having the accumulation surfaces 4 and the belts of the conveyor device 27 inclined at 4°, the propulsion force exerted on the bottles at the highest part of the accumulation surfaces by the conveyor belts 23 and 6 is decreased in which case the bottles line up easily in the subdivided passageways 7 moving into them freely for being lifted without difficulty by the lifting devices 16. Moreover, the downward force of gravity that acts on the bottles for a short distance causes a widening or opening of the stream of bottles that is supplied to conveyor device 27 across the width of the accumulation surfaces 4 whereby a particularly compact type of construction along with good accessibility to all of its parts is made possible.

Uniform distribution of the bottles in front of the individual passageways 7 on the accumulation surfaces 4 is greatly enhanced by having the subdividers or partitions 28 arranged with the longest partition in the center and decreasing the shorter partitions symmetrically arranged on opposite sides of the center one. Also the corner guides 17 and 18 favor the formation of free intermediate spaces 35. These free spaces constitute buffer zones which prevent any great increase in the pressure between accumulated bottles when there are variations in the feed rate to the accumulation surfaces 4, thereby simplifying regulation of the supply.

It should be recognized that the term "conveyor belt" used herein is to be considered generic to continuous conveyor belts as well as conveyors wherein the belts are comprised of flat plates which are pivotally connected to each other in succession to form a closed loop.

I claim:

1. Apparatus for supplying bottles to a bottle processing machine having a laterally extending inlet, comprising:

a transfer table having bottle infeed and outfeed ends, the outfeed end being arranged adjacent said inlet of the machine, a bottle supply conveyor arranged for feeding at least one stream of bottles to a bottle accumulation area on said transfer table which area extends over part of the distance between said infeed and outfeed ends of the transfer table, a plurality of laterally spaced apart divider members for subdividing said transfer table into parallel laterally adjacent passageways through which said bottles are moved on said table from said accumulation area to said inlet of the machine, said transfer table comprising a conveyor belt having a surface constituting said accumulation area, said conveyor belt being inclined at an angle upwardly from said accumulation area to said outfeed end of the transfer table.

2. The apparatus according to claim 1 wherein said angle is about 3° to 5° from horizontal.

3. The apparatus according to any one of claims 1 or 2 wherein said supply conveyor includes a conveyor belt which transports and supplies said bottles along a line which is perpendicular to the general direction in which said bottles are moved to said inlet of said bottle processing machine by said conveyor belt of the transfer table, and guides for diverting said bottles from said supply conveyor to said transfer table.

4. The apparatus according to claim 1 wherein said supply conveyor includes a conveyor belt which transports and supplies said bottles along a line which is perpendicular to the general direction in which said bottles are moved to said bottle processing machine by said conveyor belt of the transfer table, said conveyor belt of the supply conveyor is inclined transversely to the direction in which said conveyor belt translates at an angle corresponding substantially to the angle at which said conveyor belt of the transfer table is inclined.

5. The apparatus according to claim 4 wherein the angle of inclination of said supply conveyor belt and the transfer conveyor belt is about 3° to 5° from horizontal.

6. The apparatus according to any one of claims 1, 2, 4 or 5 wherein:

said transfer table is comprised of a plurality of conveyor belts arranged to run in parallel and each conveyor belt has an infeed and outfeed end and a bottle accumulation area provided contiguous to said infeed end, a plurality of barriers arranged in laterally spaced apart relationship to thereby divide said transfer table into a plurality of said bottle accumulation areas which are laterally adjacent each other, and there are a said plurality of said divider members subdividing the space between said barriers into said parallel laterally adjacent passageways at said outlet end of the transfer table through which bottles between barriers move from said accumulation areas to said inlet of the bottle processing machine, said bottle supply conveyor being comprised of a plurality of conveyor belts arranged in parallelism and means for directing the bottles on the conveyor belts of the bottle supply conveyor to the bottle accumulation areas, respectively.

7. The apparatus according to claim 6 wherein said plurality of divider members extend from said outlet end of said transfer table toward said accumulation areas, respectively, for defining said passageways to the bottle processing machine inlet and a substantially centrally positioned one of said dividers among the dividers between barriers is longer than the other divider members on each side of said one member.

8. The apparatus according to claim 7 wherein the lengths of the divider members on each side of said centrally positioned divider member decrease in length progressively away from said centrally positioned divider member.

9. The apparatus according to claim 6 wherein there are four accumulation areas constituting said plurality of accumulation areas defined by said barriers.

10. The apparatus according to claim 1 wherein there are a plurality of transfer table conveyor belts comprising said transfer table, said transfer table conveyor belts being arranged for translating in parallelism with each other and each such belt providing a bottle accumulation area which is contiguous to other of said transfer table conveyor belts, laterally spaced apart barriers defining between them the effective width of said transfer table, said divider members being arranged above said transfer table conveyor belts between pairs of said barrier members for subdividing the space between barriers into said laterally adjacent passageways, said divider members being offset laterally relative to said transfer table conveyor belts such that a bottle being conveyed through a passageway between divider members stands partially on two adjacent transfer table conveyor belts.

11. The apparatus according to claim 10 wherein said divider members include a longest divider member which is substantially centrally positioned between barriers and extends a greater part of the distance between said infeed and outfeed ends of the transfer table than do other of the divider members between a pair of barriers.

12. The apparatus according to claim 11 wherein the lengths of the divider members arranged on each side of said centrally positioned divider member decrease in length progressively away from said centrally positioned divider member.

13. The apparatus according to any one of claims 10, 11 or 12 wherein said transfer table conveyor belts are inclined in the direction in which bottles are conveyed between said infeed and outfeed ends by an angle of 3° to 5° relative to horizontal.

14. The apparatus according to claim 10 wherein said supply conveyor comprises a plurality of supply conveyor belts which translated in parallelism with each other and are perpendicular to the general direction in which said bottles are moved by said transfer table conveyor belts, said conveyor belts of the supply conveyor being inclined transversely to the direction in which the supply conveyor belts translate at an angle corresponding substantially to the angle at which said transfer table conveyor belts are inclined, said conveyor belts of the supply conveyor being arranged for delivering bottles to said infeed end of said transfer table.

15. The apparatus according to claim 14 including a plurality of guide members fixedly positioned above said supply conveyor belts at an angle relative to the direction in which said supply conveyor belts translate such that said guide members cross over said supply conveyor belts to direct bottles moving with said belts to the infeed ends of the transfer table conveyor belts residing between pairs of barriers.

16. The apparatus according to any one of claims 4 or 10 including sensors arranged along said supply conveyor belts for controlling the rate at which bottles are supplied to said transfer table.

* * * * *